(12) United States Patent
Michalske

(10) Patent No.: US 8,910,299 B2
(45) Date of Patent: Dec. 9, 2014

(54) EMERGENCY INFORMATION ACCESS ON PORTABLE ELECTRONIC DEVICES

(76) Inventor: Steven Charles Michalske, Sunnyvale, CA (US)

(*) Notice: Subject to any disclaimer, the term of this patent is extended or adjusted under 35 U.S.C. 154(b) by 1226 days.

(21) Appl. No.: 12/028,276

(22) Filed: Feb. 8, 2008

(65) Prior Publication Data
US 2009/0205041 A1 Aug. 13, 2009

(51) Int. Cl.
*G06F 12/00* (2006.01)
*G06F 13/00* (2006.01)
*G06F 21/31* (2013.01)
*H04M 1/2745* (2006.01)
*H04M 1/725* (2006.01)
*H04M 1/673* (2006.01)
*H04M 1/677* (2006.01)

(52) U.S. Cl.
CPC ............... *G06F 21/31* (2013.01); *H04M 1/673* (2013.01); *H04M 1/27455* (2013.01); *H04M 1/72541* (2013.01); *H04M 1/6775* (2013.01)
USPC .................................. 726/27; 726/16; 726/17

(58) Field of Classification Search
CPC ............................... G06F 21/31; H04M 1/673
USPC .................................. 726/16, 17, 27; 370/464
See application file for complete search history.

(56) References Cited

U.S. PATENT DOCUMENTS

| | | | |
|---|---|---|---|
| 4,295,041 A | 10/1981 | Ugon | |
| 5,933,080 A * | 8/1999 | Nojima | 340/426.19 |
| 6,574,484 B1 * | 6/2003 | Carley | 455/521 |
| 7,039,628 B2 * | 5/2006 | Logan, Jr. | 1/1 |
| 7,231,231 B2 | 6/2007 | Kokko et al. | |
| 7,240,216 B2 | 7/2007 | Ishikawa et al. | |
| 7,293,122 B1 * | 11/2007 | Schubert et al. | 710/62 |
| 7,453,443 B2 | 11/2008 | Rytivaara et al. | |
| 7,505,799 B2 | 3/2009 | Suzuki et al. | |
| 8,229,392 B2 * | 7/2012 | Bumiller et al. | 455/404.1 |
| 2002/0104005 A1 * | 8/2002 | Yin et al. | 713/185 |
| 2004/0078231 A1 * | 4/2004 | Wilkes et al. | 705/2 |
| 2004/0092248 A1 * | 5/2004 | Kelkar et al. | 455/411 |
| 2004/0203576 A1 * | 10/2004 | Droste et al. | 455/404.1 |
| 2004/0233930 A1 * | 11/2004 | Colby, Jr. | 370/464 |
| 2005/0044333 A1 * | 2/2005 | Browning | 711/164 |
| 2005/0085215 A1 * | 4/2005 | Kokko et al. | 455/404.1 |
| 2005/0086073 A1 * | 4/2005 | Rodes et al. | 705/2 |
| 2005/0122315 A1 * | 6/2005 | Chalk et al. | 345/173 |
| 2005/0151642 A1 * | 7/2005 | Tupler et al. | 340/539.18 |
| 2005/0157853 A1 * | 7/2005 | Andrew | 379/42 |

(Continued)

OTHER PUBLICATIONS

User's Guide: HP iPAQ hw 6500 Mobile Messenger Series, Hewlett-Packard, Jun. 2005, 192 pgs.

(Continued)

*Primary Examiner* — Saleh Najjar
*Assistant Examiner* — Oleg Korsak
(74) *Attorney, Agent, or Firm* — Womble Carlyle Sandridge & Rice, LLP

(57) ABSTRACT

Improved techniques for facilitating emergency access to one or more contacts stored on a portable electronic device are disclosed. One or more contacts on the portable electronic device are designated as emergency contacts. While the portable electronic device is password-locked, a request to display the one or more emergency contacts on the password-locked portable electronic device is received. Without requiring a password, the one or more emergency contacts are displayed on the portable electronic device.

24 Claims, 7 Drawing Sheets

(56) References Cited

U.S. PATENT DOCUMENTS

| | | | |
|---|---|---|---|
| 2005/0240613 A1* | 10/2005 | Logan, Jr. | 707/102 |
| 2006/0077903 A1* | 4/2006 | Hiltunen | 370/252 |
| 2006/0258389 A1* | 11/2006 | Saito et al. | 455/550.1 |
| 2007/0124804 A1 | 5/2007 | Burnham et al. | |
| 2007/0135043 A1* | 6/2007 | Hayes et al. | 455/26.1 |
| 2007/0158411 A1* | 7/2007 | Krieg, Jr. | 235/380 |
| 2007/0161410 A1 | 7/2007 | Huang et al. | |
| 2008/0077431 A1* | 3/2008 | Calder et al. | 705/2 |
| 2008/0319799 A1* | 12/2008 | Knowlton | 705/3 |

OTHER PUBLICATIONS

Rogers, "Google Heath Shows More Signs of Life", Google Health, Jan. 24, 2008, 2 pgs.

* cited by examiner

EMERGENCY INFORMATION ACCESS ON PORTABLE ELECTRONIC DEVICES

BACKGROUND OF THE INVENTION

1. Field of the Invention

In general, the invention relates to portable electronic devices and, more particularly, to accessing emergency information on portable electronic devices.

2. Description of the Related Art

Portable electronic devices, including mobile phones, PDAs (Personal Digital Assistants), and portable media players have become a near-ubiquitous part of daily life. As these devices evolve, more and more people are turning towards portable electronic devices that combine two or more of these functions into a single device (e.g., PDA phones or "smart" phones). The utility of these devices has made it increasingly likely that people who own them will rarely leave their homes without them.

One type of application that runs on many of the aforementioned portable electronic devices is an address book application. This address book application is typically used to store contact information, including telephone numbers, such that the owner of the portable electronic device is able to retrieve this contact information at will. However, the address book and other information on the portable electronic device is often accessible only to the person who owns the portable electronic device, since it is common for this type of device to be "locked" by the user to prevent unauthorized access.

Many portable electronic devices incorporate a password-lock feature, wherein a password must be entered before the device can be utilized. For example, on a typical password-locked mobile phone, any person who attempts to access information stored on the mobile phone will be presented with a password prompt and prevented from using the mobile phone until such a time as the correct password has been entered.

Typically, access to a locked portable electronic device is prevented by the use of a "screen lock". Hence, to gain access to the address book, the user can enter a password to unlock the "screen lock". However, there are situations when it would be desirable for someone who does not know the password to unlock a password-locked portable electronic device to be able to access at least some of the information on that portable electronic device. Currently, some PDAs and PDA phones display a 'welcome screen' that allows their owners to display information determined by the user when a device powers up, while maintaining the privacy of the other data on the device by requiring a password for access other information beyond that contained in the welcome screen. However, the owner of the device may not care to include identifying information or any other personal information on a device's welcome screen for many reasons including, for example, privacy concerns. Thus, there is a need for improved methods for allowing the owner of a portable electronic device to specify and customize information that can be accessed on a password-locked portable electronic device without entering the password.

Additionally, the portability and increasingly smaller sizes of portable electronic devices have the drawback of making them susceptible to loss. The design of most portable electronic devices is such that it is difficult or impossible to identify the owner of the device without extensive detective work, which is undesirable for a variety of reasons, including owner privacy concerns. Thus, there is also a need for improved methods to provide information to aid in the return of a lost portable electronic device to its rightful owner.

SUMMARY OF THE INVENTION

The invention pertains for techniques for presenting personal information, such as contact information, emergency contact information, and/or owner health-related information on a portable electronic device. In the case of a password-locked portable electronic device, limited, predetermined personal information can be presented without requiring password entry and without sacrificing the benefits of a password-lock. The personal information is typically for use in emergency situations; therefore, the personal information can also be referred to as emergency information.

According to one embodiment, a portable electronic device includes, but is not limited to, any portable electronic device capable of presenting emergency information, such as emergency contact information, and/or owner health-related information. Examples of portable electronic devices can, for example, include a mobile telephone, a pager, an electronic organizer, a Personal Digital Assistant (PDA), a portable media player, a smart phone, a PDA phone, a laptop computer, or a palmtop computer, as well on any of number of devices that incorporate more than one of the above functions.

The invention can be implemented in numerous ways, including as a method, system, device, or apparatus (including as a computer readable medium or graphical user-interface.) Several embodiments of the invention are discussed below.

In one embodiment, an emergency contact list can be displayed on a password-locked portable electronic device by designating one or more emergency contacts on the portable electronic device, activating a password-lock on the portable electronic device, subsequently receiving a request to display the one or more emergency contacts on the password-locked portable electronic device, displaying the one or more emergency contacts on the password-locked portable electronic device even though the portable electronic device is password locked.

In another embodiment of the invention, emergency alerts that have been entered by the user are displayed on the portable electronic device, without requiring entry of a password. The emergency alerts can include, but are not limited to medical conditions, food allergies, and medication allergies.

In still another embodiment of the invention, emergency medical information can be accessed on a password-lockable portable electronic device by an authorized medical care provider. The authorization of the medical care provider can be implemented as a docking station in a medical facility that authenticates the medical care provider and prevents unauthorized access to the password-locked portable electronic device.

In another embodiment of the invention, non-emergency information on a password-locked portable electronic device can be accessed by an authorized medical provider.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains for techniques for presenting personal information, such as contact information, emergency contact information, and/or owner health-related information on a portable electronic device. In the case of a password-locked portable electronic device, limited, predetermined personal information can be presented without requiring password entry and without sacrificing the benefits of a password-lock. The personal information is typically for use in emergency situations; therefore, the personal information can also be referred to as emergency information.

According to one embodiment, a portable electronic device includes, but is not limited to, any portable electronic device capable of presenting emergency information, such as emergency contact information, and/or owner health-related information. Examples of portable electronic devices can, for example, include a mobile telephone, a pager, an electronic organizer, a Personal Digital Assistant (PDA), a portable media player, a smart phone, a PDA phone, a laptop computer, or a palmtop computer, as well on any of number of devices that incorporate more than one of the above functions.

Many portable electronic devices incorporate a password-lock feature, wherein a password must be entered before the device can be utilized. For example, on a typical password-locked mobile phone, any person who attempts to access information stored on the mobile phone will be presented with a password prompt and prevented from using the mobile phone until such a time as the correct password has been entered.

There are various reasons for password-locking a portable electronic device. For example, failure to protect a device with a password-lock can cause serious harm in the form of misappropriated private and/or secret information if the device is ever stolen. However, in situations where the owner of a password-locked device is incapacitated or deceased, the password-lock on the device can actually hinder efforts to contact the owner's family. For example, if a person is traveling alone and becomes incapacitated, a delay can occur while police or other officials attempt to locate the family of that person, especially when that person is far from home. Notwithstanding the conventional method of keeping one's emergency contact information in a wallet or purse, one potential source of emergency contact information is a mobile phone or PDA. Thus, several of the various embodiments of the invention are directed towards a portable electronic device that can present at least emergency contact information.

Embodiments of the invention are discussed below with reference to FIGS. 1(a)-6(d). However, those skilled in the art will readily appreciate that the detailed description given here in with respect to these figures is for explanatory purposes as the invention extends beyond these limited embodiments.

Figure 1A:
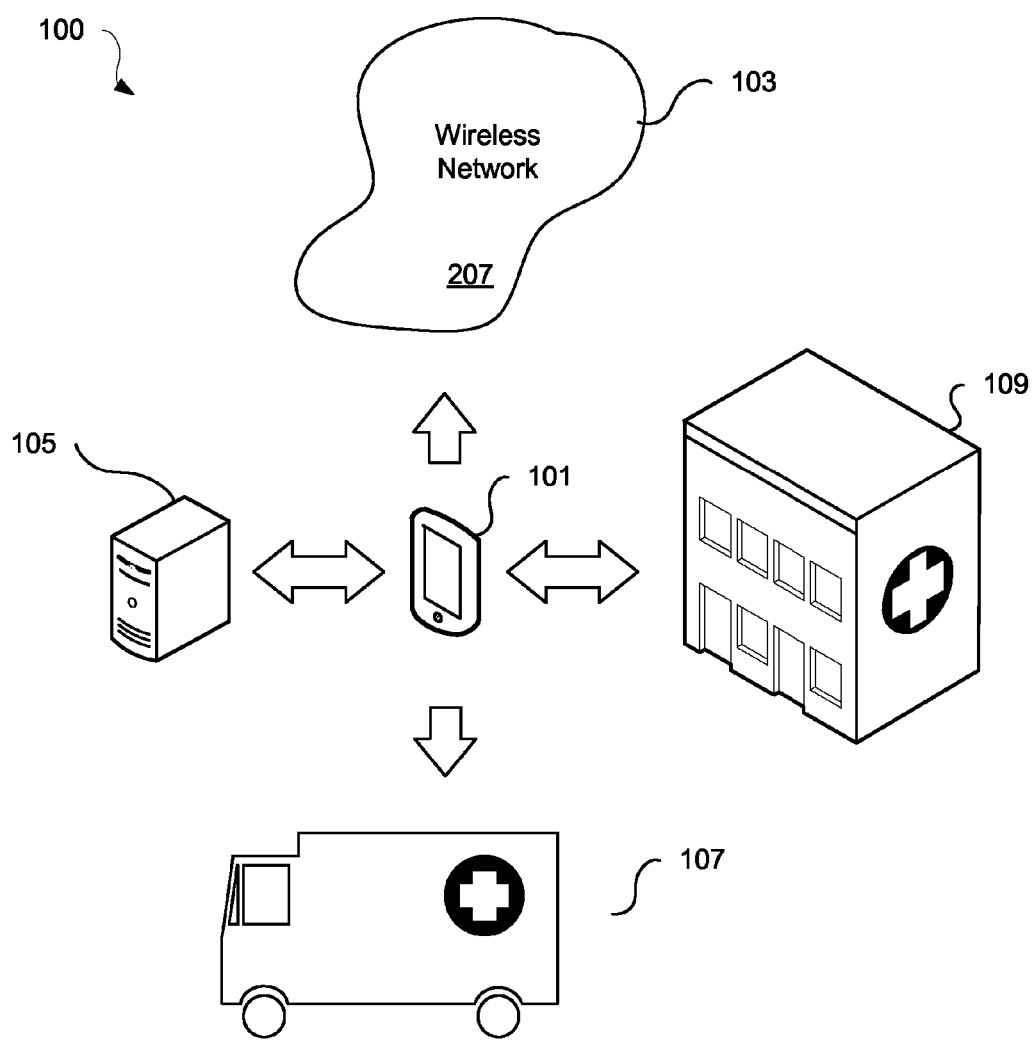
FIG. 1(a) is a block diagram of an emergency environment according to one embodiment of the invention.

FIG. 1(a) is a block diagram of an emergency environment 100 according to one embodiment of the invention. The emergency environment 100 includes a portable electronic device 101. The portable electronic device 102 can interact with a wireless network 103, a personal computer 105, an emergency health care provider 107, and/or a non-emergency health care provider 109. The portable electronic device 101 can interact with the wireless network 103. The wireless network 103 can refer to a cellular network or other wireless network, for example, IEEE 802.11(a), (b) or (g) (WiFi), IEEE 802.16 (WiMax), or Ultra-Wideband (UWB). The portable electronic device 101 can also interact with the personal computer 105. The portable electronic device 101 can connect to the personal computer 105 using the wireless network 103. Alternately, the portable electronic device 101 can connect to the personal computer 105 using a wired network (not shown), a docking station, a cable connection (e.g., USB or FireWire cable), or a hardware connection.

The portable electronic device 101 can also interact with an emergency health care provider 107. The emergency health care provider 107 can be, for example, an emergency medical technician (EMT) or an emergency room care provider. Still further, the portable electronic device 101 can interact with a non-emergency emergency health care provider 109. The portable electronic device 101 can interact with the non-emergency health care provider 109 using a personal computer located at the non-emergency health care provider 109 in a manner similar to that as described above for the interaction between the portable electronic device 101 and the personal computer 105.

The portable electronic device 101 can store personal information (or emergency information) for its user. The portable electronic device 101 can also provide a "software lock" to restrict access to the personal information. For example, once the "software lock" is engaged, the personal information on the portable electronic device 101 is generally not accessible unless the "software lock" is disengaged. However, a user (e.g., owner) of the portable electronic device 101 can designate certain personal information stored on the portable electronic device 101 to be available in the event of an emergency.

In one embodiment, the user of the portable electronic device 101 can enter various personal information, namely, emergency information, into the portable electronic device 101 where it is stored. Typically, the portable electronic device 101 have the "software lock" engaged when the portable electronic device 101 is turned on or when unutilized for a period of time. However, even with the "software lock" engaged, the emergency information for the user can be made available while other information stored on the portable electronic device 101 remains unavailable. In one embodiment, the "software lock" can be bypassed to gain access to the emergency information.

As one example, assume that the owner of the portable electronic device 101 has entered predetermined medical information into the portable electronic device 101 that is to be available even if the "software lock" is engaged. In such case, the medical information remains available to anyone possessing the portable electronic device 101. If the owner is injured in an accident, the portable electronic device 101, if it accompanies the owner, can be used to access the predetermined medical information. For example, a medical care provider 107, 109 can easily interact with the portable electronic device 101 to cause the portable electronic device 101 to present (e.g., display). In doing so, the medical care provider 107, 109 is not required to unlock the "software lock"; instead, the "software lock" can be bypassed such that the predetermined information can be accessed even though the "software lock" remains engaged. The predetermined medical information can, for example, provide medical information (such as allergies, existing medications, blood type, medical conditions or other health information, etc.) and/or emergency contacts. Emergency contacts are persons that can be contacted in case of an emergency. These emergency contacts are identified by the portable electronic device 101 can, in some embodiment, be directly called via the portable electronic device 101 if the portable electronic device 101 supports wireless voice calls.

The portable electronic device utilized herein can, for example, correspond to a portable computing device (e.g., personal computer), mobile phone (e.g., cellular phone), personal digital assistant (PDA), digital media player (e.g., music, videos, games, images), media storage device, camera, remote control, and/or the like. The electronic device may also be a multi-functional device that combine two or more of these device functionalities into a single device.

The portable electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Figure 1B:
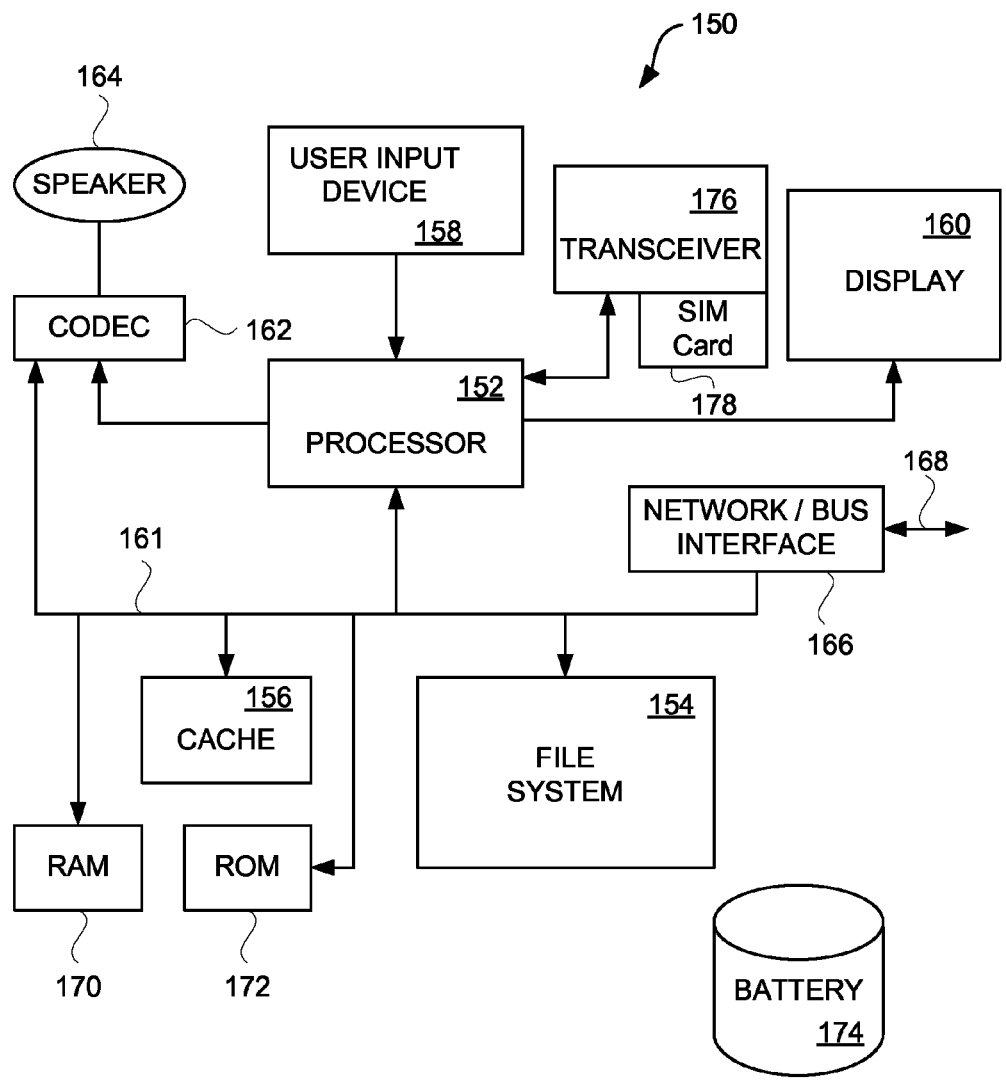
FIG. 1(b) is a block diagram of a mobile multi-function device according to one embodiment of the invention.

FIG. 1(b) is a block diagram of a mobile multi-function device 150 according to one embodiment of the invention. The mobile multi-function device 150 can include the circuitry of a portable electronic device that can perform the operations described herein. The mobile multi-function device 150 includes hardware and software components to provide at least two functions, namely, a media playback function (including display screen/menu presentations) and a wireless voice communications function. When providing media playback, the mobile multi-function device 150 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 150 can operate as a mobile telephone (e.g., cellular phone).

The mobile multi-function device 150 includes a processor 152 that pertains to a microprocessor or controller for controlling the overall operation of the mobile multi-function device 150. The mobile multi-function device 150 stores media data pertaining to media items in a file system 154 and a cache 156. In one embodiment, the file system 154 is implemented by a storage disk or a plurality of disks. In another embodiment, the file system 154 is implemented by EEPROM or Flash type memory. The file system 154 typically provides high capacity storage capability for the mobile multi-function device 150. However, because the access time to the file system 154 can be relatively slow, the mobile multi-function device 150 can also include a cache 156. The cache 156 is, for example, Random-Access Memory (RAM) provided by semiconductor memory. The relative access time to the cache 156 is substantially shorter than for the file system 154. However, the cache 156 does not have the large storage capacity of the file system 154. Further, the file system 154, when active, consumes more power than does the cache 156. The power consumption is often a concern when the mobile multi-function device 150 is a portable mobile multi-function device that is powered by a battery 174. The mobile multi-function device 150 also includes a RAM 170 and a Read-Only Memory (ROM) 172. The ROM 172 can store programs, utilities or processes to be executed in a non-volatile manner. The ROM 172 can be implemented by an Electrically Erasable Programmable Read-Only Memory (EEPROM) or Flash type memory so as to provide writable non-volatile data storage. The RAM 170 provides volatile data storage, such as for the cache 156.

In one embodiment, to support wireless voice communications, the mobile multi-function device 150 includes a transceiver 176 and a SIM card 178. The transceiver 176 supports wireless communication with a wireless network (such as a wireless cellular network). The SIM card 178 includes an identifier (e.g., SIM identifier) can be used by the mobile multi-function device 150 to gain access and utilize the wireless network. In other embodiments, a SIM card 178 is not utilized.

The mobile multi-function device 150 also includes a user input device 158 that allows a user of the mobile multi-function device 150 to interact with the mobile multi-function device 150. For example, the user input device 158 can take a variety of forms, such as a button, keypad, dial, etc. Still further, the mobile multi-function device 150 includes a display 160 (screen display) that can be controlled by the processor 152 to display information to the user. A data bus 161 can facilitate data transfer between at least the file system 154, the cache 156, the processor 152, and the coder/decoder (CODEC) 162.

In one embodiment, the mobile multi-function device 150 serves to store a plurality of media items (e.g., songs) in the file system 154. When a user desires to have the mobile multi-function device play a particular media item, a list of available media items is displayed on the display 160. Then, using the user input device 158, a user can select one of the available media items. The processor 152, upon receiving a selection of a particular media item, supplies the media data (e.g., audio file) for the particular media item to a coder/decoder (CODEC) 162. The CODEC 162 then produces analog output signals for a speaker 164. The speaker 164 can be a speaker internal to the mobile multi-function device 150 or external to the mobile multi-function device 150. For example, headphones or earphones that connect to the mobile multi-function device 150 would be considered an external speaker.

The mobile multi-function device 150 also includes a bus interface 166 that couples to a data link 168. The data link 168 allows the mobile multi-function device 150 to couple to a host device (e.g., host computer or power source). The data link 168 can also provide power to the mobile multi-function device 150.

Figure 2:
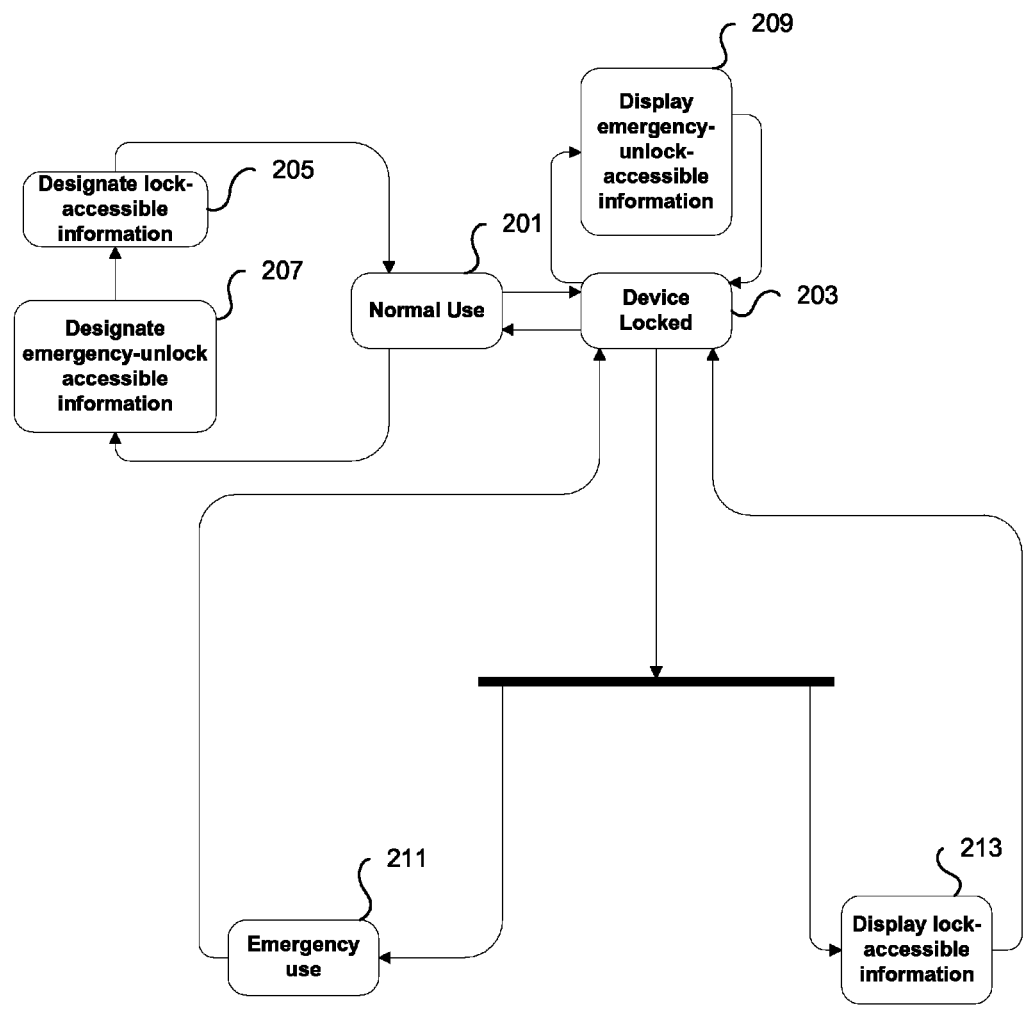
FIG. 2 is a state diagram modeling various states of a portable electronic device according to one embodiment of the invention.

FIG. 2 is a state diagram 200 modeling various states of a portable electronic device according to one embodiment of the invention. In state diagram 200, the portable electronic device is at least capable of placing phone calls, displaying information as text and/or graphics, activating/deactivating a password lock, and connecting to other devices (via wireless, cable or dock).

In a device unlock state 201, the portable electronic device is unlocked and can be used normally. For example, normal use of a mobile phone can include all the conventional uses of a mobile phone such as accessing the mobile phone's phonebook application (which stores contact information), placing calls and sending text messages.

In a device password-locked state 203, the portable electronic device is password-locked. For example, in the device password-locked state 203, the portable electronic device has a "software lock" engaged or activated. In device password-locked state 203, all information stored on the portable electronic device is inaccessible unless otherwise specified. Once the portable electronic device placed in the device password-locked state 203, the portable electronic device cannot be unlocked without entering a password or employing some other authentication, for example voice recognition.

In a device lock-accessible information designation state 205, lock-accessible information can be designated by the owner of the portable electronic device. Lock-accessible information is information that the user designates as accessible even though the portable electronic device has been password-locked. That is, lock-accessible information is accessible even if the password to unlock the portable electronic device is unknown. Examples of lock-accessible information can include, for example, emergency information and contact information for the owner of the portable electronic device.

In device emergency-unlock state designation state 207, emergency-unlock accessible information can be designated by the owner of the generic portable electronic device. Emergency-unlock accessible information is information that can be accessed after an emergency-unlock has been performed on a locked portable electronic device. Emergency-unlock accessible information can be any subset of the total information contained on the corresponding unlocked portable device. For example, emergency-unlock accessible information can include information that a user would want his doctor to have access to in the event of an emergency but would not want a stranger to be able to access without his permission. Examples of emergency-unlock accessible information could include medical records, emergency contact information, and medical alerts such as medicine allergies.

From the device password-locked state 203, the state diagram 200 can transition to a device emergency-unlock display state 209. In the device emergency-unlock display state 209, the portable electronic device displays emergency-unlock accessible information if it has been designated by the owner of the portable electronic device. The device emergency-unlock display state 209 can allow an authorized user to have limited access to information on the generic portable electronic device. In one embodiment, the device emergency-unlock display state 209 can only be entered when authorized medical personnel initiate an emergency-unlock. For example, medical personnel could enter a medical password or could place the portable electronic device in an authorized docking device.

Moreover, from the device password-locked state 203, the state diagram 200 can transition to a device emergency call state 211. In the device emergency call state 211, emergency phone calls can be made from the portable electronic device (assuming the device has the capability to make phone calls). A well known example of device emergency call state 211 is the dialing of 9-1-1, which is required for mobile phones in United States, regardless of whether the mobile phone is locked. Device emergency call state 211 typically does not allow access to any information contained on the portable electronic device.

Alternatively, from the device password-locked state 203, the state diagram 200 can also transition to a device lock accessible state 213. In device lock-accessible information state 213, the portable electronic device displays lock-accessible information if it has been designated by the owner of the portable electronic device. The device lock accessible state 213 can allow anyone with physical access to the portable electronic device to view lock accessible information (e.g., predetermined personal information). In one embodiment of the invention, any person who operates the portable electronic device can access the lock-accessible information that has been designated by the owner, but cannot not access any other information contained on the portable electronic device.

Figure 3:
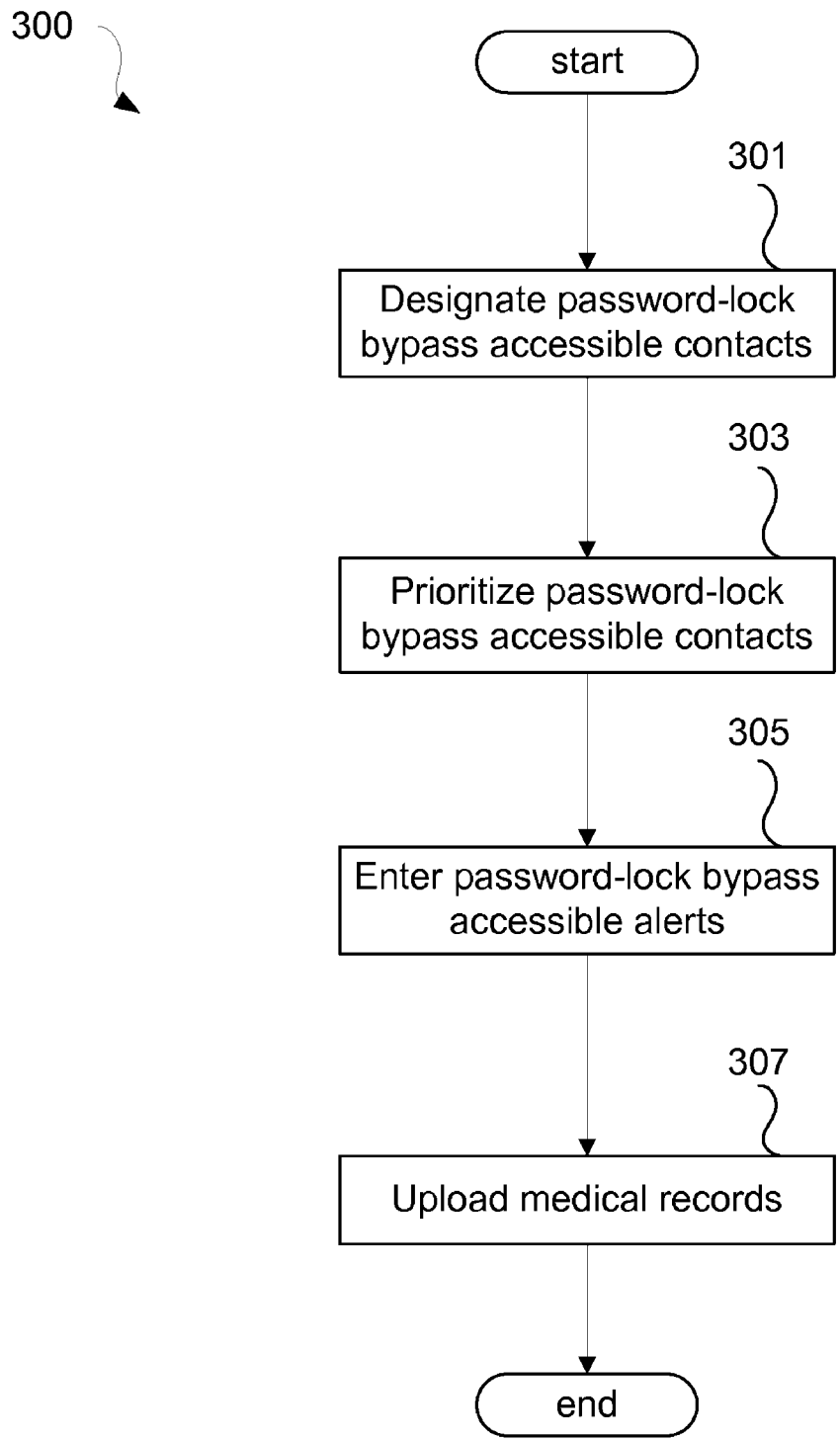
FIG. 3 is a flow diagram of a password-lock bypass information designation process according to one embodiment of the invention.

FIG. 3 is a flow diagram of a password-lock bypass information designation process 300 according to one embodiment of the invention. The password-lock bypass information designation process 300 can be used to designate information that can be displayed on a password-locked portable electronic device without requiring that the user know the password to unlock the portable electronic device. The password lock bypass information designation process 300 can be used, for example with the portable electronic device 101 of FIG. 1.

The information that can be designated by the password-lock bypass information designation process 300 can include, for example, a list of emergency contacts designated by the owner of a portable electronic device. Further, in one embodiment of the invention, the list of emergency contacts can include names of the emergency contacts, but does not display contact information. Instead, according to this embodiment, the list of emergency contacts is composed of icons or buttons representing each emergency contact, and selection of the icon or button associated with an emergency contact can sends a text-message or dial a phone number associated with that emergency contact without displaying a phone number.

The password-lock bypass information designation process 300 begins with the designation 301 of one or more contacts (i.e., password-lock bypass accessible contacts) on the portable electronic device that will be available for display on a particular portable electronic device. In one embodiment of the invention, contacts that are contained in a contact database that is stored on the portable electronic device are used. For example, one or more individual telephone numbers in a contact database stored on a mobile telephone can be designated as password-lock bypass accessible contacts. Alternately, password-lock bypass accessible contacts can be manually entered independently of a contact database.

Next, the list of password lock bypass accessible contacts can prioritized 303 with a call-order preference according to the device owners wishes. For example, if the device owner designates 301 his wife, his mother, and his brother as password lock bypass accessible contacts, he can also designate (i.e., prioritize 303) that his wife, his mother, and his brother are to be contacted in that order. Although the password-lock bypass information designation process 300 need not prioritize the list of password lock bypass contacts, prioritizing the password lock bypass accessible contacts (e.g., emergency contacts) can assist others in contacting the highest priority contact that is available.

If the user so desires, then one or more password-lock bypass accessible alerts can also be entered 305 into the portable electronic device. According to one embodiment of the invention, password-lock bypass accessible alerts are alerts that can be displayed on the portable electronic device in order to inform, alert, or warn any person who has bypassed the password-lock on that portable electronic device. For example, an informational alert can be entered announcing to anyone who comes across a misplaced portable electronic device to inform others how to contact the owner for return of the portable electronic device (and maybe a reward for the return of the portable electronic device). Alternately, if a person has a medical condition that requires special attention, a medical alert can be entered 305 into the device. A medical alert can serve to alert others of a medical condition of the owner, such as during an emergency involving the owner.

Optionally, the owner of a portable electronic device can upload and store any other information that he regards as important to be accessible in the event of an emergency. In one embodiment of the invention, the owner of the portable electronic device can upload 307 medical records into his portable electronic device, with the hope that a medical practitioner will think to check the portable electronic device in the event of an emergency.

Figure 4:
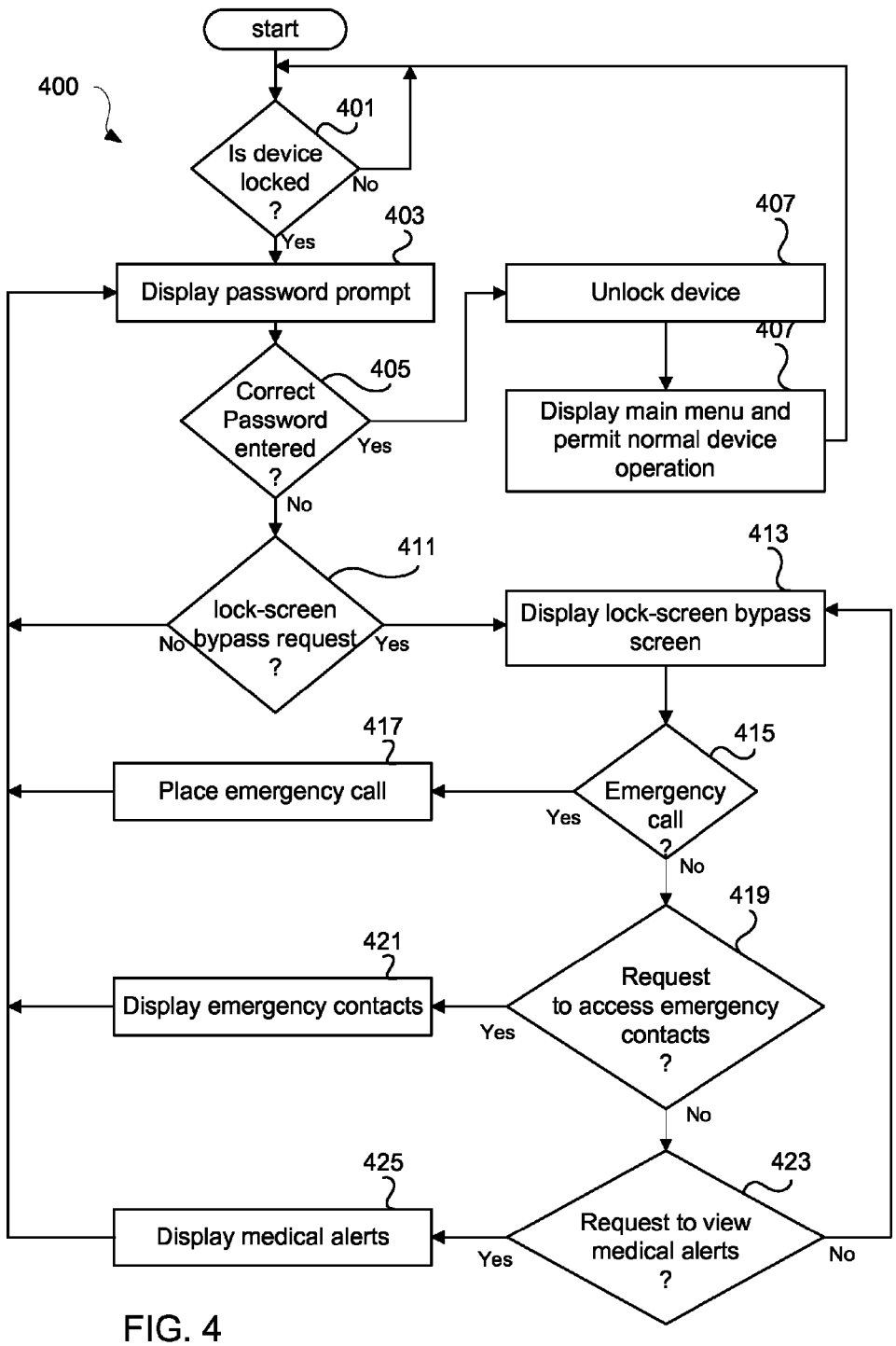
FIG. 4 is a flow diagram of a password-lock bypass process according to one embodiment of the invention.

FIG. 4 is a flow diagram of a password-lock bypass process 400 according to one embodiment of the invention. The password lock bypass process 400 can be used to access owner-designated information on a password-locked portable electronic device.

The password-lock bypass process 400 can begin with a decision 401 that determines if a request to interact with a password-locked portable electronic device has been received. If not, the password-lock bypass process 400 awaits until such time as the decision 401 determines that the password-lock has been activated. Next, a password-prompt can be displayed 403 (e.g., on an unlock-screen). Subsequently, a decision 405 can determine if a correct password has been entered in response to the password-prompt. If the decision 405 determines that the correct password has been entered, then the device is unlocked 407. Once unlocked 407, the portable electronic device can be permitted 409 normal device operation (e.g., display the device main menu, etc.).

If, on the other hand, the decision 405 determines that the correct password has not been entered, then a decision 411 can determine if a request has been made to bypass the lock-screen. If the decision 411 determines that a request to bypass the lock screen has been made, then a lock screen bypass screen can be displayed 413. If, on the other hand, decision 411 does not detect a request to bypass the lock screen, then the password-lock bypass process 400 returns to block 403 and subsequent blocks.

Once the lock screen bypass screen is displayed 413, several options are available. These options can include, but are not limited to, the option to place an emergency call, the option to display emergency contacts, and the option to display medical alerts. If the password-lock bypass process 400 detects 415 a request to make an emergency call (e.g., "911" is dialed), then emergency call can be placed 417. Upon completion of the emergency call, the password-lock bypass process 400 returns to block 403 and subsequent blocks. If the password-lock bypass process 400 detects 419 a request to access emergency contacts, then one or more emergency contacts can displayed 421. The one or more emergency contacts can be, for example, a type of lock-accessible information as described in above in reference to the device lock-accessible information designation state 205 of FIG. 2. Once the emergency contacts have been displayed 421, then the portable electronic device-lock process 400 can return to block 403 and subsequent blocks.

If the password-lock bypass process 400 detects 423 a request to view medical alerts, then one or more medical alerts can be displayed 425. Medical alerts can be, for example, a type of lock-accessible information as described above in reference to state 205 of FIG. 2. Once the medical alerts have been displayed 425, then the portable electronic device-lock process 400 can return to block 403 and subsequent blocks. If none of decisions 415, 419, or 423 detect a request, then the password-lock bypass process 400 returns to block 413 and subsequent blocks. In one embodiment of the invention, after a set period of time (e.g., five minutes) has elapsed, the portable electronic device lock bypass process 400 returns to decision 403. The transition from block 413 to block 403 is not shown on FIG. 4.

In one embodiment of the invention, decisions 415, 419, and 423 are implemented as buttons or icons displayed 413 on the lock screen bypass screen. The decisions 415, 419 and 423 are presented in no particular order. Accordingly, decisions 415, 419 and 423 can be executed in any order or simultaneously. Furthermore, if emergency contacts or emergency alerts have not been entered into the portable electronic device, then the options to display 421 emergency contacts and display 425 medical alerts can be omitted. Further still, in devices that are not capable of making telephone calls, the decision 419 and the block 417 can be omitted.

Figure 5:
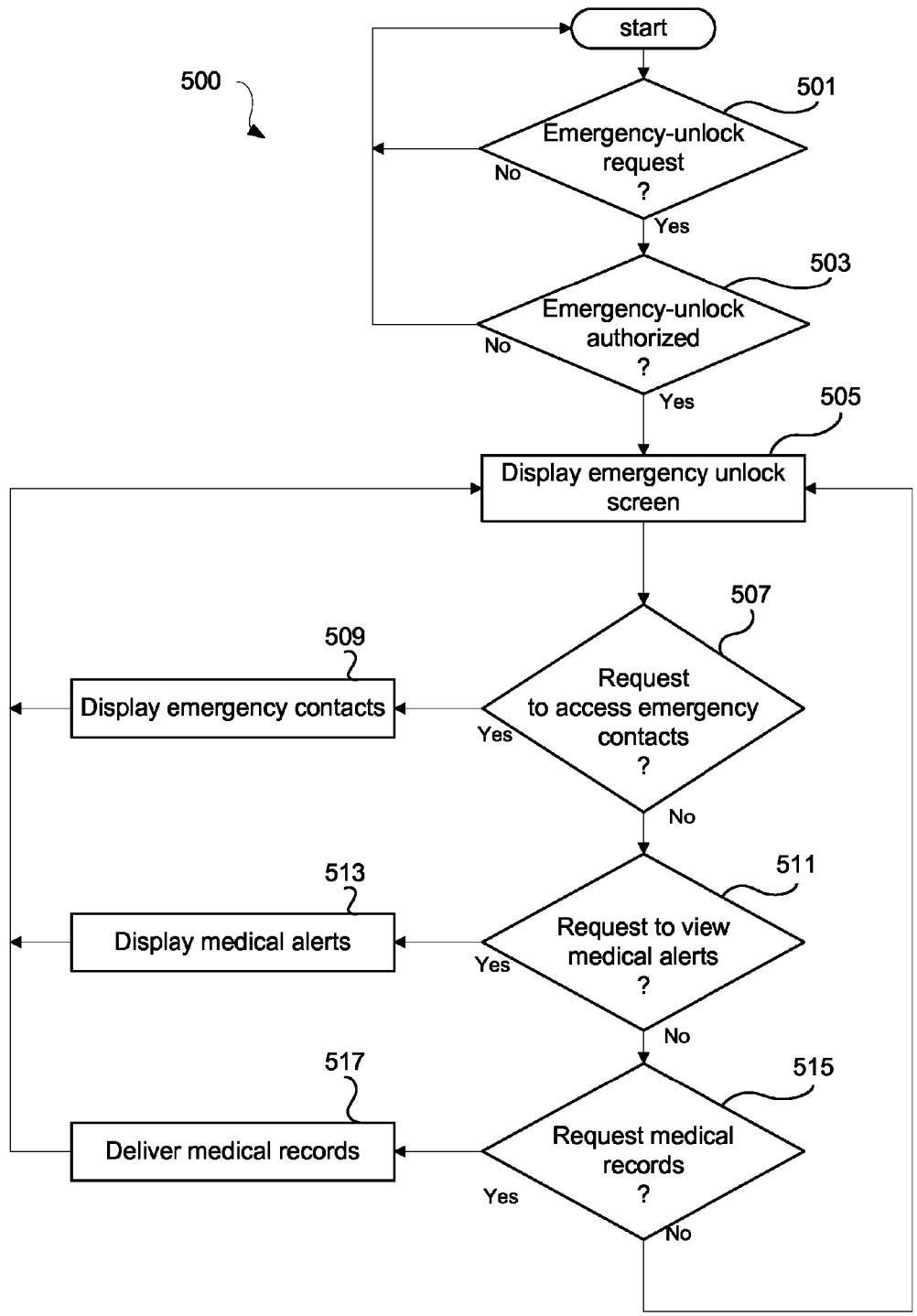
FIG. 5 is an emergency-unlock process according to one embodiment of the invention.

FIG. 5 is an emergency-unlock process 500 according to one embodiment of the invention. The emergency unlock process 500 can be used to access owner designated emergency information on a password-locked portable electronic device.

The emergency-unlock process 500 can begin with a decision 501 that detects a request to initiate an emergency-unlock of a password-protected portable electronic device. The request to initiate an emergency unlock can be initiated, for example, by an authorized healthcare provider. In one embodiment of the invention, an authorized healthcare provider is recognized by an authentication system that is connected to a personal computer located on the premises of the healthcare provider. The authentication system prevents unauthorized access to the password-protected portable electronic device. For example, special hardware such as a docking station may be required to be connected to the password-protected portable electronic device in order to initiate the emergency-unlock of a password-protected portable electronic device.

If decision 501 does not detect an emergency-unlock request, then the emergency-unlock process 500 can wait until such time as a request for an emergency emergency-unlock of the password-protected portable electronic device is detected. If, on the other hand, a request for an emergency unlock of the password-protected portable electronic device is detected, then a second decision 503 can determine if requested emergency-unlock is authorized. If the requested emergency-unlock is authorized, then an emergency unlock screen can be displayed 505. However, if decision 503 determines that the requested emergency-unlock is not authorized, then the emergency-unlock process 500 can return to block 501 and subsequent blocks.

Once the emergency unlock screen is displayed 505, several options are available. These options can include, but are not limited to, the option to display 509 one or more emergency contacts, the option to display 513 one or more medical alerts, and the option to upload 517 (or print) medical records that are stored on the portable electronic device. Once the emergency-unlock screen has been displayed 505, the emergency-unlock process 500 can continue to decision 507 which detects a request to access emergency contacts on the emergency-unlocked portable electronic device. If decision 507 detects a request to access emergency contacts on the emergency unlocked portable electronic device, then one or more emergency contacts can be displayed 509 on the emergency-unlocked portable electronic device. Once the one or more emergency contacts have been displayed 509, the emergency-unlock process 500 can continue to block 505 and subsequent blocks. If decision 511 detects a request to view medical alerts, then one or more medical alerts can be displayed 513. Once the one or more medical alerts have been displayed 513, the emergency-unlock process 500 can continue to block 505 and subsequent blocks. If decision 515 detects a request for medical records, then medical records can be delivered 517 (e.g., downloaded to an authorized healthcare provider computer or printer). Once the requested medical records are delivered 517, then the emergency-unlock process 500 can continue to block 505 and subsequent blocks. If none of decisions 507, 511 or 515 detect a request, then the emergency-unlock process 500 can return to block 505 and subsequent blocks.

The decisions 509, 513 and 517 are presented in no particular order. Accordingly, the decisions 509, 513 and 517 can be executed in any order or simultaneously. Furthermore, if any of the one or more of the emergency contacts, emergency alerts, or medical records have not been entered into the portable electronic device, then the corresponding options to display 509 emergency contacts, display 513 medical alerts, and/or deliver 517 medical records can be omitted.

FIGS. 6(a)-6(d) are exemplary user interfaces according to several embodiment of the invention. The exemplary user interfaces depict, respectively, a lock-screen display 601, an emergency dial pad display 621, a medical art display 641, and an emergency contact list display 661. The exemplary user interfaces are shown on a large display mobile phone having PDA capabilities (e.g., a PDA phone).

Figure 6A:
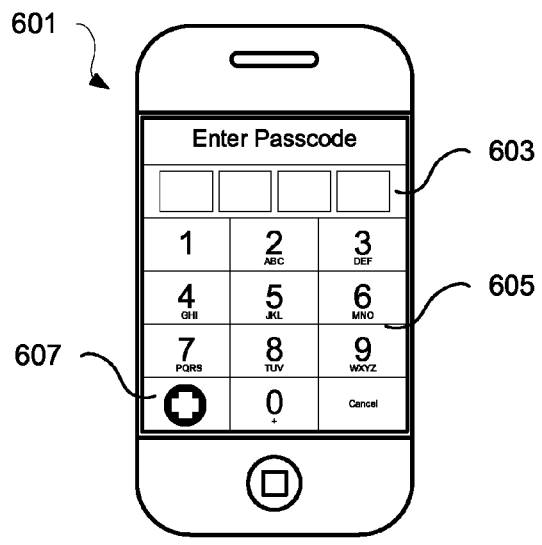
FIGS. 6(a)-6(d) are exemplary user interfaces according to several embodiment of the invention.

FIG. 6(a) depicts the lock-screen display 601 according to one embodiment of the invention. The lock-screen display 601 includes a password (or pass-code) prompt 603, an alphanumeric keypad 605, and a lock-screen bypass control 607. When the lock-screen bypass control 607 is selected, the emergency dial pad display 621 of FIG. 6(b) can be presented of the display of the mobile phone.

Figure 6C:
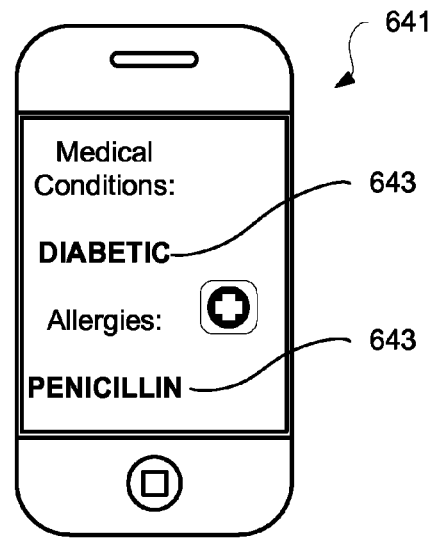
Figure 6B:
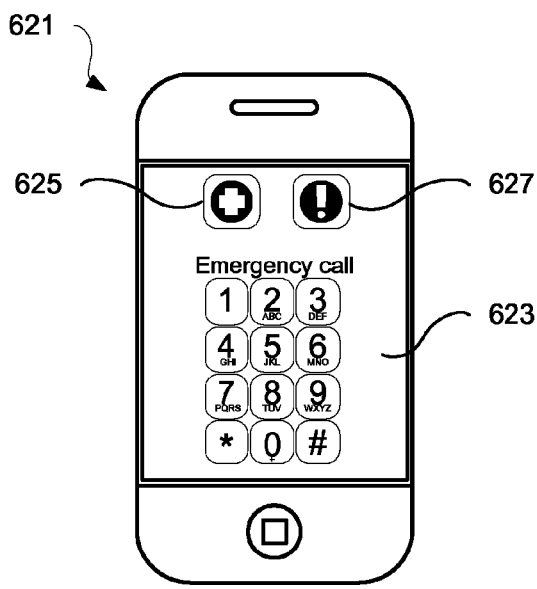

FIG. 6(b) depicts the emergency dial pad display 621 according to one embodiment of the invention. The emergency dial pad display 621 depicts a standard telephone keypad 623 for use in making an emergency phone call, a medical alert display control 625, and an emergency contact display control 627. In one embodiment, when the medical alert control 625 is selected, the medical alert display 641 of FIG. 6(c) can be presented on the display of the mobile phone. Also, in one embodiment, when the medical alert display control 627 is selected, the emergency contact list display 661 can be presented on the display of the mobile phone.

FIG. 6(c) depicts the medical alert display 641 according to one embodiment of the invention. The medical alert display 641 presents two medical alerts 643. The alerts 643 can be entered by the owner of the mobile phone. The medical alerts can alert the viewer to any kind of medical condition, for example food allergies, medication allergies, and chronic medical conditions.

Figure 6D:
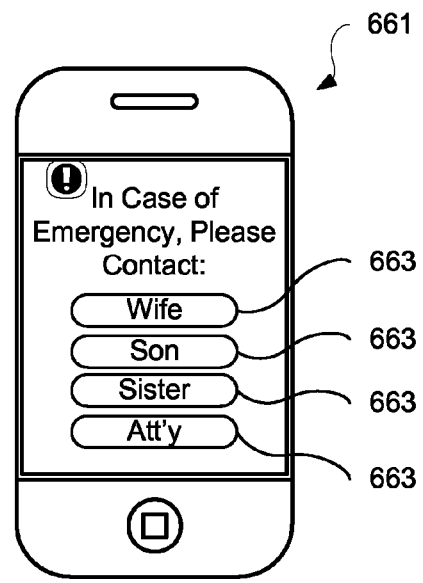

FIG. 6(d) depicts the emergency contacts display 661 according to one embodiment of the invention. The emergency contacts display 661 presents a plurality of emergency contacts 663. In the embodiment depicted in FIG. 6(d), the emergency contacts display 661 illustrates four contacts. However, beyond relationship identifiers, no other contact information is displayed in this embodiment, thereby minimizing release of personal information. In one embodiment, selection of one of the displayed contacts can invoke automatic dialing of the telephone number associated with the corresponding displayed contact (without disclosing the telephone number to the dialer). In another embodiment, the emergency contacts display 661 can present the names and telephone numbers of the emergency contacts.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that predetermined personal information can be made available on a portable electronic device even though the portable electronic device is access protected by a "software lock". Another advantage of the invention is that a user can designate personal information, such as emergency contacts or medical alerts, that is to be made available. Still another advantage of the invention is that medical records can be made accessible to authorized medical personnel.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A machine-readable non-transitory storage medium storing instructions that, when executed by a processor included in a portable computing device, cause the portable computing device to carry out steps that include:
    storing lock-accessible information that includes an emergency contact;
    receiving a user preference to designate certain personal information associated with the emergency contact to be accessible during an emergency, wherein the user preference includes a setting for displaying a relationship identifier associated with the emergency contact and concealing a telephone number of the emergency contact; and
    when the portable computing device is password-locked:
        receiving a request to display the lock-accessible information, and
        in response to determining that the request is to display the emergency contact:
            concurrently displaying the relationship identifier associated with the emergency contact and preventing access to the telephone number associated with the emergency contact, and
            when the relationship identifier is selected:
                placing a phone call or sending a text message.

2. The machine-readable non-transitory storage medium of claim 1, wherein the relationship identifier is displayed without requiring entry of a password.

3. The machine-readable non-transitory storage medium of claim 1, wherein, when the portable computing device is password-locked, a contact stored on the portable computing device other than the emergency contact is not available for display.

4. The machine-readable non-transitory storage medium of claim 1, wherein the steps further include prioritizing two or more emergency contacts into a user-specified order.

5. The machine-readable non-transitory storage medium method of claim 1, wherein the portable computing device is a mobile telephone.

6. A machine-readable non-transitory storage medium storing instructions that, when executed by a processor included in a portable computing device, cause the portable computing device to carry out steps that include:
when the portable computing device is unlocked:
storing a medical alert and an emergency contact,
designating a telephone number associated with the emergency contact to be inaccessible when the portable computing device is locked,
designating a relationship identifier associated with the emergency contact to be accessible when the portable computing device is locked; and
when the portable computing device is locked:
concurrently displaying a numeric keypad, an emergency contacts icon, and a medical alerts icon, wherein:
the numerical keypad is configured as an interface for a user to dial an emergency telephone number,
the emergency contacts icon is configured to, when selected, simultaneously display the relationship identifier associated with the emergency contact and prevent the telephone number of the emergency contact from being displayed, and
the medical alerts icon is configured to, when selected, to display the medical alert.

7. The machine-readable non-transitory storage medium of claim 6, wherein the medical alert includes medical conditions and allergies that are configured to be displayed concurrently.

8. The machine-readable non-transitory storage medium of claim 6, wherein the steps further include dialing the telephone number associated with the displayed relationship identifier when the portable computing device is locked and the relationship identifier is selected.

9. The machine-readable non-transitory storage medium of claim 6, wherein the medical alert includes an allergy to a medication.

10. The machine-readable non-transitory storage medium of claim 6, wherein the medical alert includes a food allergy.

11. The machine-readable non-transitory storage medium of claim 6, wherein the portable computing device is a mobile telephone.

12. The machine-readable non-transitory storage medium of claim 6, wherein the portable computing device is a portable media player.

13. A portable computing device, comprising:
a processor; and
a memory configured to store instructions that, when executed by the processor, cause the portable computing device to carry out the steps that include:
when the portable computing device is unlocked:
storing lock-accessible information that includes an emergency contact;
storing a user preference for designating certain personal information associated with the emergency contact to be accessible during an emergency, wherein the user preference includes a setting for displaying a relationship identifier associated with the emergency contact and concealing a telephone number of the emergency contact; and
when the portable computing device is locked:
receiving a request to display the lock-accessible information, and
in response to determining that the request is to display the emergency contact:
simultaneously displaying the relationship identifier associated with the emergency contact and preventing access to the telephone number associated with the emergency contact, and when the relationship identifier is selected:
placing a phone call or sending a text message.

14. The portable computing device of claim 13, wherein the steps further include dialing the telephone number associated with the displayed relationship identifier when the portable computing device is password-locked and the relationship identifier is selected.

15. A portable computing device, comprising:
a processor; and
a memory configured to store instructions that, when executed by the processor, cause the portable computing device to carry out the steps that include:
when the portable computing device is unlocked:
storing a medical alert and an emergency contact;
designating a telephone number associated with the emergency contact to be inaccessible when the portable computing device is locked;
designating a relationship identifier associated with the emergency contact to be accessible when the portable computing device is locked; and
when the portable computing device is locked:
displaying a numeric keypad, an emergency contacts icon, and a medical alert icon, wherein:
the numerical keypad is configured as an interface for a user to dial an emergency telephone number,
the emergency contacts icon is configured, when selected, to concurrently display the relationship identifier associated with the emergency contact and prevent the telephone number of the emergency contact from being displayed, and
the medical alert icon is configured, when selected, to display the medical alert.

16. The portable computing device of claim 15, further comprising a display configured to present an emergency information screen that includes information regarding one or more medical conditions of a user of the portable computing device.

17. The portable computing device of claim 16, wherein the emergency information screen is configured to display multiple emergency contacts associated with a user of the portable computing device.

18. The portable computing device of claim 15, wherein the emergency contacts icon is configured, when selected, to concurrently display multiple relationship identifiers associated with multiple emergency contacts.

19. The portable computing device of claim 15, wherein the portable computing device is a handheld device having telephone capabilities, wireless capabilities, and media playback capabilities.

20. The portable computing device of claim 15, wherein the medical alert icon is configured, when selected, to block access to the medical alert if a request to display the medical alert is not authorized.

21. A method, comprising:
- storing, at a computing device, lock-accessible information that includes an emergency contact;
- receiving a user preference to designate certain personal information associated with the emergency contact to be accessible during an emergency, wherein the user preference includes a setting for displaying a relationship identifier associated with the emergency contact and concealing a telephone number of the emergency contact; and
- when the computing device is password-locked:
    - receiving a request to display the lock-accessible information, and
    - in response to determining that the request is to display the emergency contact:
        - concurrently displaying the relationship identifier associated with the emergency contact and preventing access to the telephone number associated with the emergency contact, and
        - when the relationship identifier is selected:
            - placing a phone call or sending a text message.

22. The method of claim 21, wherein the relationship identifier is displayed without requiring entry of a password.

23. The method of claim 21, wherein, when the computing device is password-locked, a contact stored on the computing device other than the emergency contact is not available for display.

24. The method of claim 21, further comprising prioritizing two or more emergency contacts into a user-specified order.

\* \* \* \* \*

UNITED STATES PATENT AND TRADEMARK OFFICE
CERTIFICATE OF CORRECTION

PATENT NO.         : 8,910,299 B2
APPLICATION NO.    : 12/028276
DATED              : December 9, 2014
INVENTOR(S)        : Steven Charles Michalske It is certified that error appears in the above-identified patent and that said Letters Patent is hereby corrected as shown below:

In the Claims:

Column 13, line 8 (Claim 5, line 2): "method of claim 1," should read --of claim 1,--.

Column 13, line 23 (Claim 6, line 14): "numeric" should read --numerical--.

Column 13, line 59 (Claim 13, line 5): "out the steps" should read --out steps--.

Column 14, line 35 (Claim 15, line 15): "numeric" should read --numerical--.

Column 14, line 50 (Claim 16, line 4): "a user" should read --the user--.

Column 14, line 54 (Claim 17, line 3): "a user" should read --the user--.

Signed and Sealed this
Twenty-eighth Day of April, 2015

Michelle K. Lee
*Director of the United States Patent and Trademark Office*